United States Patent
Peckingham

[11] 3,922,589
[45] Nov. 25, 1975

[54] ELECTRICAL CONTROL SYSTEMS OF ELECTROMAGNETIC VIBRATORS
[75] Inventor: John F. Peckingham, Hamden, Conn.
[73] Assignee: Vibra-Metrics, Inc., East Haven, Conn.
[22] Filed: June 28, 1974
[21] Appl. No.: 484,183

[52] U.S. Cl. .............................. 318/126; 318/129
[51] Int. Cl.² .......................................... H02K 33/00
[58] Field of Search .......... 318/126, 128, 129, 130, 318/132, 133

[56] References Cited
UNITED STATES PATENTS
3,215,916  11/1965  Hermann ..................... 318/129 X
3,648,136  3/1972  Krajewski et al. ............. 318/132 X Primary Examiner—R. N. Envall, Jr.

[57] ABSTRACT

A drive circuit for electromagnetic vibrators. In a preferred embodiment, a transistor switch is used in combination with a passive waveshaping network to achieve approximately equal rise and fall times for coil current. The waveshaping network also protects the transistor switch from excessive voltages during switching.

6 Claims, 3 Drawing Figures

ELECTRICAL CONTROL SYSTEMS OF ELECTROMAGNETIC VIBRATORS

This invention relates to control systems for electromagnetic vibrators and more particularly relates to control systems for electromagnetic vibrators of the type which permit the amplitude and drive frequency of the vibrator to be varied.

Control systems of the type to which the present invention pertains are well known in the art and generally speaking comprise a vibratory motor, a direct current power supply, an electronic switching means which regulates the flow of current to the vibratory motor to produce a periodic motion of the motor, means for controlling the frequency of periods of conductivity of said electronic switching means, and means for controlling the amplitude of motion of the vibratory motor by varying the portion of each vibratory cycle during which the electronic switching means permits current to flow through the vibratory motor (duty cycle). The vibratory motor (or electromagnetic vibrator) may be used as the drive element in vibratory feeders, conveyor troughs, compactors, and so forth. Generally, the frequency of the control system is adjusted to be coincident with the natural resonant frequency of the vibratory motor in combination with the structure being driven (such as a conveyor trough), so that the most efficient operation will be obtained. The weight of the material being transported by the feeder affects this natural resonant frequency. If this weight changes, either as a result of a change in material or a "pile-up" of the material being fed, this natural resonant frequency will change and the amplitude of the motion of the feeder will decrease. Some means is therefore desirable to permit variation of the excitation frequency of the electronic switching means to permit "re-tuning" of the system during operation.

Certain difficulties must be overcome in the design of the electronic switching means which regulates the flow of current to the vibratory motor. The motor is an inductive load; some means must be provided to protect the control circuitry from damage due to excessive voltages occurring when the current in the motor is interrupted. The amount of current which can flow through the motor is limited by the temperature rise in the windings of the motor. An optimum waveshape exists which results in maximum motion of the vibratory motor for a given amount of heating. The electronic switching means should contain circuitry to achieve this desired current waveshape. Losses in the control circuit should be kept to a minimum. Previous circuits, employing thyratrons, magnetic amplifiers, controlled semiconductor rectifiers, or vacuum tubes, have not been completely successful in achieving these objectives.

Accordingly, the present invention provides a new and improved control system whose electronic switching means achieves the above objectives through the use of an electronic switch in combination with a novel waveshaping network. This waveshaping network is comprised of a diode, a resistor, and a capacitor, and results in an approximately triangular current waveform, with the current through the vibratory motor rising and falling in approximately equal time intervals. This same network also limits the voltage across the transistor to prevent voltage breakdown of the transistor.

An object of this invention is to provide a control system for electromagnetic vibrators whereby the current waveform results in a maximum vibration with a minimum power loss.

Another object of this invention is to provide a low cost method of protecting semiconductor elements in a control system for electromagnetic vibrators from failure due to excessive voltage.

The features of the invention, which are believed to be novel, are set forth with particularity and distinctly claimed in the concluding portion of this specification. The invention however, both as to its operation and organization, together with further objects and advantages thereof may be best appreciated by reference to the following detailed description taken in conjunction with the drawings in which FIG. 1 is a diagram partly schematic and partly in block form of an electrical control system which embodies the invention in conjunction with a vibratory motor.

Figure 1:
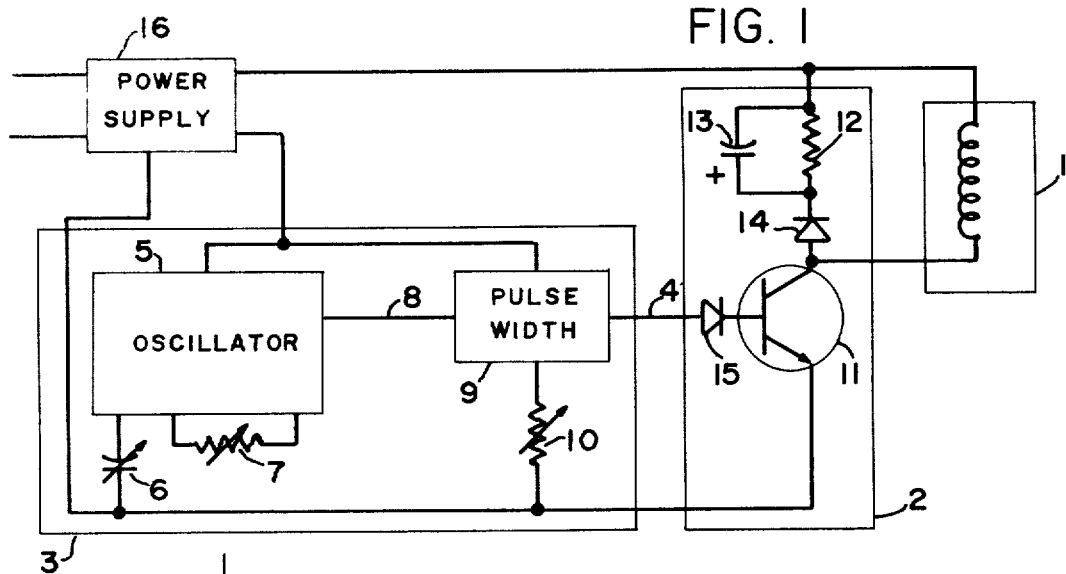
Figure 2:
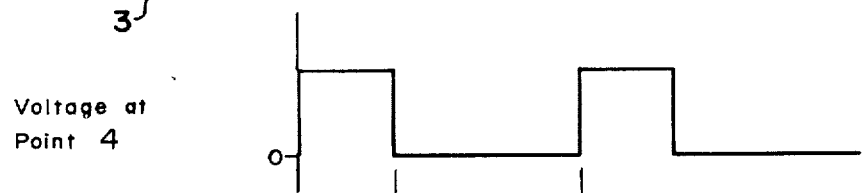
FIG. 2 is a plot of the voltage at point 4 with respect to ground potential as a function of time and is also a plot of the collector to emitter voltage of transistor 11 as a function of time.
Figure 3:
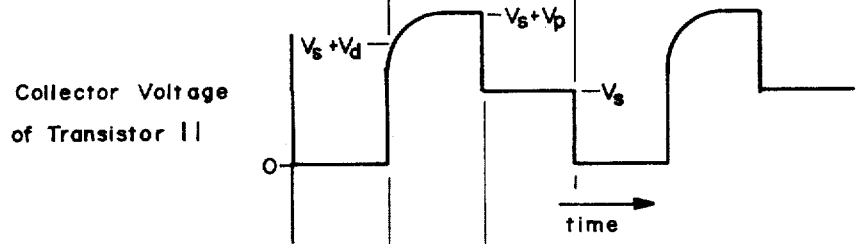
FIG. 3 is a plot of the current through coil 1 as a function of time.
Figure 3:
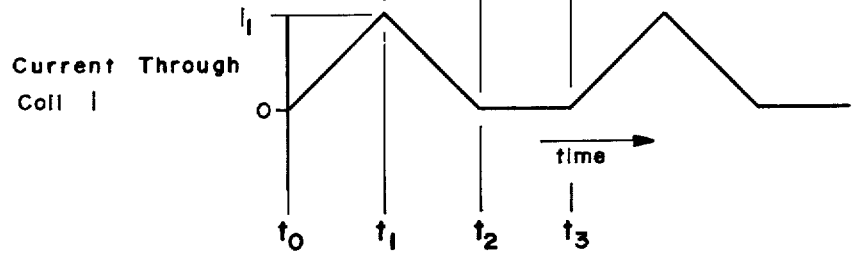

Referring to FIG. 1 of the drawings, there is shown a vibratory motor, 1. Such a motor may be used to drive a vibratory conveyor or "feeder." The general structure of one type of vibratory feeder is discussed in more detail in the patent of Earle V. Francis, U.S. Pat. No. 2,161,342, issued June 6, 1939 entitled "Vibratory Feeder" to which reference is made for a more complete disclosure thereof. Said vibratory feeder is designed to receive material at one end, for example, from a feed hopper, and discharge it over its other end. Other types of vibratory feeders are available and may be used in conjunction with the subject invention, such as a type in which material travels in a track up the inside rim of a bowl.

Pulsating current is supplied to the vibratory motor, 1, by connecting the motor coil and an electronic switch, 2, in series across the output of a DC power supply, 16.

The electronic switch, 2, comprises a transistor, 11, which is operated in its fully conductive or fully non-conductive mode, together with a waveshaping network which includes a capacitor, 13, a resistor, 12 and a diode 14. The transistor, 11, is controlled by varying the voltage at the base thereof. A diode, 15, is connected in series with the base to prevent damage to the remainder of the circuit in the event the transistor, 11, fails in such a way that the base and the collector were shorted together. When the transistor is rendered conductive, current will pass through the coil of motor 1 and transistor 11.

Signal generator, 3, is employed to generate a periodic pulsating or rectangular wave voltage which connected to the input, 4, of the switch, 2, results in periodic motion of the vibratory motor. In the signal generator, 3, an oscillator, 5, creates a square wave with an approximate 50 percent duty cycle. The frequency of the square wave may be varied by adjusting the value of capacitor, 6, and/or resistance 7. In practice, the output frequency of the oscillator may typically be varied between 45Hz to 140Hz. Varying the oscillator frequency changes the frequency of motion of the feeder. These controls are usually adjusted to the resonant or natural frequency of the feeder, at which point maximum output is obtained for a given drive level. The square wave output of oscillator 5 is connected to the input 8 of a pulse width circuit, 9. The duty cycle of the square wave may be varied from a maximum of approximately 50 percent to a minimum of approximately 10 percent by adjusting the pulse width control resistor, 10. It will be readily apparent to those skilled in the art that this in turn controls the amplitude of motion to the vibratory feeder.

If transistor 11 is rendered conductive by applying a voltage to its base which is positive relative to its emitter, current will flow to the vibratory motor coil 1 due to the supply potential impressed across the coil. Current will not flow through resistance 12 or capacitance 13 since diode 14 is reverse biased. At time $t_0$, transistor 11 is switched on. The current through the coil and transistor increases approximately linearly from zero to a value $i_1$ at time $t_1$. At time $t_1$ transistor 11 is switched off. Current flowing in the coil is now forced to flow through the diode 14 and the parallel combination of resistance 12 and capacitance 13. The capacitor 13 charges up to a value $V_p$ at time $t_2$ while the current in the coil decays toward zero. The magnitude of voltage $V_p$ is a function of the inductance of coil 1, the capacitance of capacitor 13 and the resistance of resistor 12. The values of capacitor 13 and resistor 12 are so selected that the rate of decay of the current is made approximately equal to the rate of increase in current when the transistor is switched on. During the time interval $t_2$ to $t_3$, the voltage across capacitor 13 decays to a value $V_d$ due to the discharge path provided by resistor 12. The cycle is then repeated. The time interval $t_0$ to $t_3$ is determined by the frequency of the oscillator and is the period of oscillation of the vibratory motor.

In addition to shaping the current waveform, this circuit also limits the voltage across the transistor 11 to a maximum value of the supply voltage, $V_s$, plus the peak capacitor voltage, $V_p$. Without this circuit to dissipate the energy stored in the inductance (coil 1), the voltage across the transistor would rise until voltage breakdown of the transistor occurred, resulting in failure of the transistor.

The optimum values of capacitor 13 and resistor 12 are dependent on the dynamic impedance of the vibrator coil 1. This dynamic impedance is a function of the amount of motion of the drive member of the vibratory motor and the amount of saturation of the magnetic structure, and varies as a function of drive current. However, experimental data shows that for most vibratory feeders this dynamic impedance is proportional to the inverse of the rated maximum drive current of the feeder. The optimum values of capacitor 13 and resistor 12 can therefore be specified in terms of the maximum rated coil current as follows:

$$C = 50\, I_{max}$$

$$R = \frac{700}{I_{max}}$$

where $C$ is the value of capacitor 13 in microfarads, $I_{max}$ is the maximum rated coil current of the feeder in amps, and $R$ is the value of resistor 12 in ohms.

In one example, a feeder rated at a maximum current of 2 amps requires an optimum value for the capacitor 13 of 100 microfarads and an optimum value of the resistor 12 of 350 ohms.

While aspects of the preferred embodiment have been described in detail, it should be apparent to those skilled in the art that certain modifications and variations thereof are possible in light of the above teachings. It is therefore understood that the present disclosure has been made only by way of example and that numerous changes in the construction and the combination and arrangement of parts may be resorted to without departing from the spirit and the scope of the invention as defined by the claims hereto appended.

I claim:

1. A controllable supply circuit for electromagnetic vibrators including: a vibratory electromagnetic motor having a coil, a source of direct current, an electronic switching device having a control electrode connected in series with said source and said coil such that a signal applied to said electrode affects the conductivity of said switching device, circuit means for providing a rectangular pulse signal to said control electrode to alternately render said switch conductive and non-conductive and establish and interrupt a circuit through said coil, a circuit including a capacitor, and a uni-directional conducting device connected in parallel with said coil, said uni-directional conducting device having its polarity opposite that of said switch, and a resistance connected in parallel with said capacitance.

2. The apparatus of claim 1 where the magnitude of the capacitor C, and the resistor, R, are related to the maximum rated current of the coil of the vibratory electromagnetic motor as follows:

$$C = 50\, I_{max}$$

and $$R = \frac{700}{I_{max}}$$

where $C$ is the capacitance value in microfarads, $R$ is the resistance value in ohms, and $I_{max}$ is the maximum rated current through the coil in amperes.

3. The combination recited in claim 1 wherein a unidirectional conducting device is connected in series with the input to the control electrode of the electronic switch, said unidirectional conducting device having sufficiently high voltage breakdown characteristics and a direction of conductivity such that a breakdown of said switching device which raises the electrical potential at the control electrode will not result in current flow through said unidirectional conducting device.

4. A controllable supply circuit for electromagnetic vibrators comprising:
   a vibratory electromagnetic motor having a coil,
   a source of direct current,
   an electronic switching device having a control electrode and connected in series with said source and said coil such that a signal applied to said electrode affects the conductivity of said switching device,
   circuit means for providing a rectangular pulse signal at said control electrode to alternately render said switch conductive and non-conductive and establish and interrupt a circuit through said coil, whereby when said switch is conductive the current through said coil rises with time at an essentially linear rate,
   a circuit including a capacitor and a unidirectional conducting device having its direction of conductivity opposite that of said switch, said circuit connected in parallel with said coil, a resistor connected in parallel with said capacitor, said resistor and said capacitor having values selected to produce decay of current through said coil at substantially the same rate as the rise thereof.

5. The apparatus of claim 4 further including means for varying the frequency of said pulse signal.

6. The apparatus of claim 5 further including means for varying the pulse width of the rectangular pulse signal.

* * * * *